United States Patent
Cohn et al.

(10) Patent No.: US 9,820,320 B2
(45) Date of Patent: Nov. 14, 2017

(54) DOCKING STATION AND METHOD TO CONNECT TO A DOCKING STATION

(71) Applicant: Intel IP Corporation, Santa Clara, CA (US)

(72) Inventors: Daniel Cohn, Raanana (IL); Tom Harel, Shefayim (IL); Ran Mor, Petach-Tikva (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/963,372

(22) Filed: Dec. 9, 2015

(65) Prior Publication Data

US 2017/0171894 A1    Jun. 15, 2017

(51) Int. Cl.
| | | |
|---|---|---|
| *H04M 1/725* | (2006.01) |
| *H04W 76/02* | (2009.01) |
| *H04W 4/02* | (2009.01) |
| *H04W 48/06* | (2009.01) |
| *H04W 76/06* | (2009.01) |
| *G06F 1/16* | (2006.01) |

(52) U.S. Cl.
CPC ........ *H04W 76/023* (2013.01); *G06F 1/1632* (2013.01); *H04M 1/7253* (2013.01); *H04M 1/72527* (2013.01); *H04W 4/023* (2013.01); *H04W 48/06* (2013.01); *H04W 76/027* (2013.01); *H04W 76/06* (2013.01)

(58) Field of Classification Search
CPC .................................................. G06F 1/1632
See application file for complete search history.

(56) References Cited

U.S. PATENT DOCUMENTS

| | | | | |
|---|---|---|---|---|
| 7,949,797 B2* | 5/2011 | Yan | ...................... | H04L 43/0811 710/15 |
| 8,010,728 B1* | 8/2011 | Grady | .................. | G06F 1/1632 710/303 |
| 8,254,992 B1* | 8/2012 | Ashenbrenner | ....... | G06F 1/1632 455/41.2 |
| 9,304,545 B2* | 4/2016 | Ramirez | ................ | G06F 1/1632 |
| 2006/0233191 A1* | 10/2006 | Pirzada | .................. | H04W 88/00 370/463 |
| 2010/0057969 A1 | 3/2010 | Meiri et al. | | |
| 2010/0216397 A1* | 8/2010 | Takasu | .................. | G06F 1/1616 455/41.1 |
| 2012/0246294 A1 | 9/2012 | Eaton et al. | | |

(Continued)

FOREIGN PATENT DOCUMENTS

WO    2015116202 A2    6/2015

OTHER PUBLICATIONS

European search report issued for corresponding application No. 16196130.5-1879 dated Apr. 25, 2017; 11 pages.

*Primary Examiner* — David Bilodeau
(74) *Attorney, Agent, or Firm* — Vierling, Jentschura & Partner mbB

(57) ABSTRACT

A docking station and a method for establishing a wireless connection to a device in which the docking station is configured to use the distance between the device and the docking station in the admission and retention control decision. This effectively prevents the wireless docking session from initiating, or drops an existing session, when the user is determined to be outside of the effective work area as determined by the docking station.

11 Claims, 9 Drawing Sheets

(56) References Cited

U.S. PATENT DOCUMENTS

2014/0065956 A1* 3/2014 Yang .................... H04B 5/0012
455/41.1
2014/0148193 A1* 5/2014 Kogan .................. H04W 76/06
455/456.1

* cited by examiner

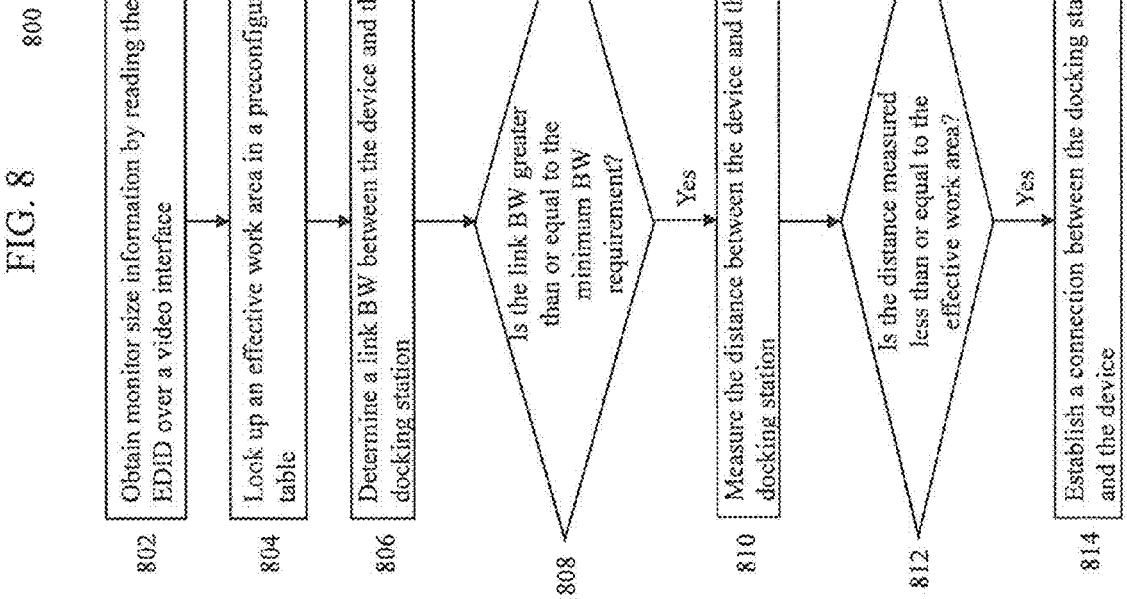

DOCKING STATION AND METHOD TO CONNECT TO A DOCKING STATION

TECHNICAL FIELD

Various embodiments relate generally to docking stations, and more particularly, wireless docking stations.

BACKGROUND

Wireless docking stations, or wireless docking systems, are used to wirelessly connect a mobile device to a set of peripherals, through a concentrator known as a docking station, in the user work environment. These peripherals typically include monitors, pointing devices (e.g. mice), keyboards, cameras, storage device, computers, projectors, music players, video players, speakers, and the like.

Providing an acceptable docking experience with wire-like quality requires a minimum bandwidth level available at the wireless link. When the available bandwidth at the wireless link is below this minimum value, the wireless docking experience is not acceptable to the typical user. For example, the quality of the image at the dock monitor will be below what the user finds acceptable. To avoid this, wireless docking systems implement a function known as admission and drop control, whereby the wireless docking session is not initiated until the minimum bandwidth level required is available at the wireless link, and the session is dropped when this bandwidth is no longer available. The admission and drop control function constantly monitors the link quality to estimate the available bandwidth and make a decision on whether to initiate or drop the wireless docking session. The set of locations where the link is such that the required bandwidth for admission is available is known as the admission range. The set of locations where the link is such that the required bandwidth for retention to the wireless docking session is available is known as the retention range.

Required bandwidth for admission and drop may not be the same, due to several reasons. For example, the admission decision might include a safety margin to avoid an undesirable scenario where shortly after admission the link conditions worsen and the session is dropped. For simplicity, in what follows, this distinction will be ignored and admission and retention range will be assumed to be identical and referred to as admission range.

Wireless docking systems support a mode where the user automatically connects to the dock whenever he enters admission range. This mode is required to allow a fully seamless docking experience where the user does not need to open an application in the mobile device (i.e. the client), or even open the device lid where relevant in order to initiate a wireless docking session. This mode is known as auto-connect and is expected to be the preferred connection mode of most users.

Depending on the propagation characteristics of the environment, the admission range may be much larger than the physical size of the user working area (office or cubicle). For example, the admission range may be as large as 10 meters (m) from the dock, while a typical cubicle size is 2 m by 2 m. In such a case, in the autoconnect mode, the user may connect to the docking station when well outside his working area. This presents a privacy issue, as the user screen is projected on the dock monitor when the user is not physically inside his working environment and other people may have access to the user's private information.

A possible solution to this privacy problem would be to increase the minimum bandwidth level requested for admission and retention in order to artificially decrease the admission range. The problem with this solution is that it also decreases the system coverage within the working environment, e.g. in locations where the line of sight to the dock is blocked. This is because the spatial directivity of the radiation together with specific orientation of the platform, or presence of obstacles, may result in equivalent link conditions in such situations that are completely different from user perspective. For example, a client 0.5 m away from the dock on the same cubicle might experience similar link conditions as a client 10 m away from the dock in a different cubicle. Therefore, decreasing the admission range to avoid unintended automatic connection to a dock 10 m away might also prevent intended automatic connection to a dock 0.5 m away.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 8 shows a flowchart for connecting to a docking station in an aspect of the disclosure.

FIG. 9 shows an exemplary chart for determining the effective work area based on monitor size in an aspect of the disclosure.

DESCRIPTION

Figure 1:
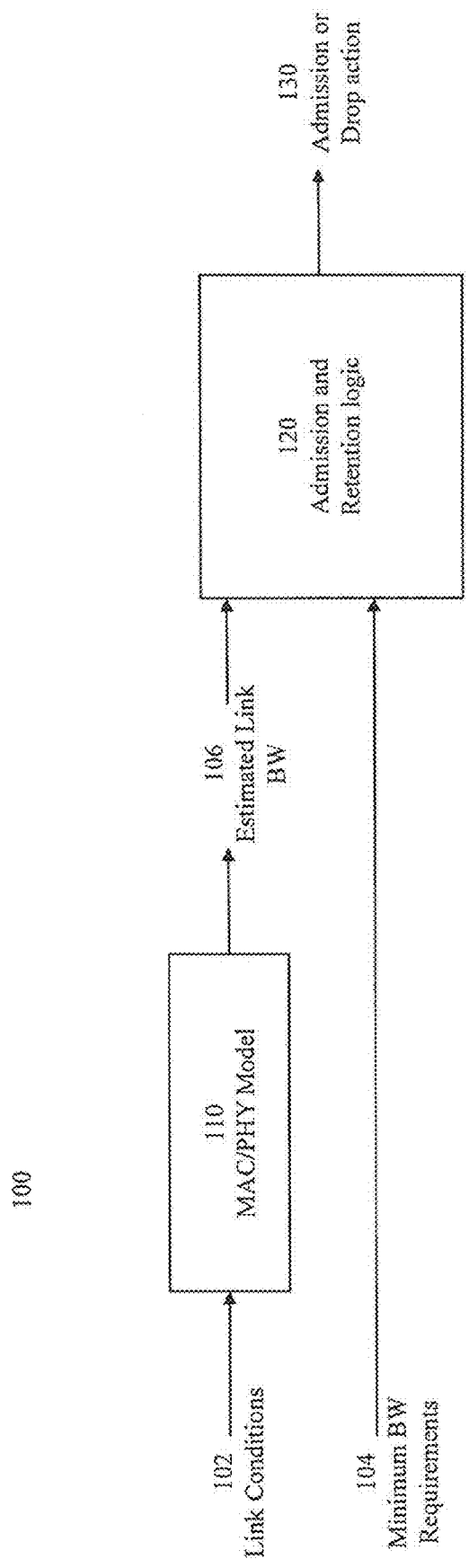
FIG. 1 describes the prior art of the admission and retention logic.

The following details description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

As used herein, a "circuit" may be understood as any kind of a logic implementing entity, which may be special purpose circuitry or a processor executing software stored in a memory, firmware, and any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, e.g., any kind of computer program, for example, a computer program using a virtual machine code, e.g., Java. Any other kind of implementation of the respective functions which will be described in more detail below may also be understood as a "circuit". It may also be understood that any two (or more) of the described circuits may be combined into one circuit.

A "processing circuit" (or equivalently "processing circuitry" or a "processor") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

As used herein, the terms "wireless docking system," "wireless docking station," "docking station," "docking system," "dock", and "wireless dock" are interchangeable.

FIG. 1 shows the prior art admission and retention control mechanism 100. The link conditions 102 between the device and the docking station are converted into an estimated link bandwidth (BW) 106 by a media access control (MAC)/physical layer (PHY) model 110. The PHY connects a link layer device (e.g. the MAC) to a physical medium such as an optical fiber, copper cable or the like. It typically includes a physical coding sublayer and a physical medium dependent layer. The MAC is a data communication protocol and is a sublayer of the data link layer, i.e. layer 2. The MAC provides addressing and channel access control mechanisms that make it possible for several terminals or network nodes to communicate within a multiple access network that incorporates a shared medium (e.g. an Ethernet network).

The admission and retention logic 120 compares the estimated link BW 106 to the 104 minimum BW requirements to arrive at an admission or drop action 130. If the estimated link BW 106 is greater or equal to the minimum BW requirements 104, the wireless docking station is admitted, i.e. the wireless docking session is initiated, or retained if already admitted. However, if the estimated link BW 106 is less than the minimum BW requirements 104, the wireless docking session is denied admission, or dropped if having already been admitted. There may be a margin, i.e. hysteresis, between the admission and drop decision, whereby admission occurs if the estimated link BW is greater than or equal to the minimum BW requirements plus the fixed margin, and dropped if the estimated link BW is lower than the minimum BW requirements, without the fixed margin.

In this manner, the estimated link BW 106 is continuously monitored and compared to the minimum BW requirements 104 to determine whether to connect to the docking station, or if already connected, whether to maintain the connection or drop the connection. The system (i.e. docking station) uses a preconfigured system model to calculate available BW from the measured link conditions. The system model takes into account the MAC/PHY protocol considerations as well as thermal and other limitations.

Figure 2:
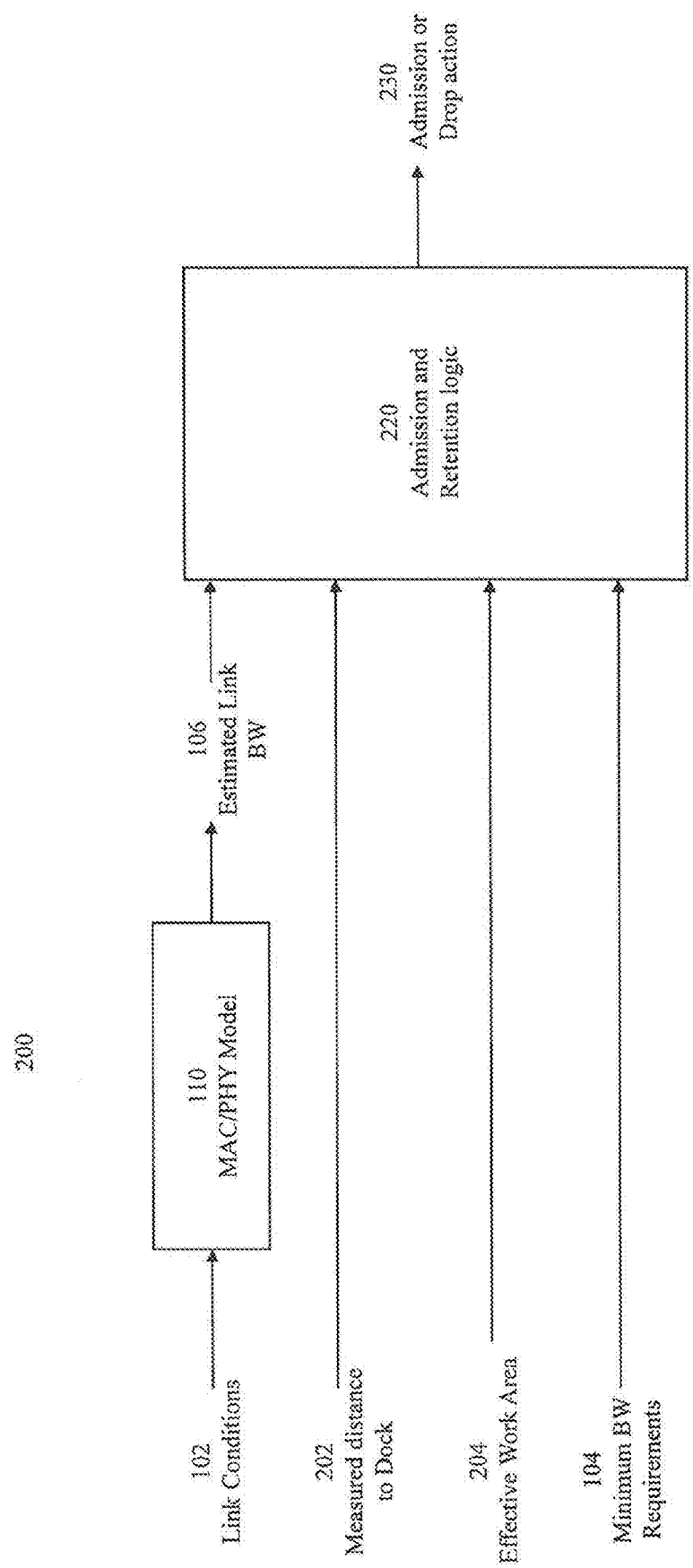
FIG. 2 shows an exemplary diagram of the admission and retention logic in an aspect of the disclosure.

FIG. 2 shows an exemplary diagram 200 of the admission and retention logic of a wireless docking station in an aspect of the disclosure. The estimated distance to dock 202 and the effective work area 204 are additional inputs to be used by the admission and retention logic 220 in determining the admission or drop action 230. In this mechanism, the wireless docking session will be initiated when the estimated wireless link BW 106 is greater than or equal to the minimum BW requirements 104 and the measured distance to the dock 202 is less than or equal to the effective work area 204. Likewise, the wireless session will be dropped when the estimated wireless link BW 106 is less than the minimum BW requirements 104 or the measured distance to the dock 202 is greater than the effective work area 204. Effective work area determinations are discussed in later figures.

Both the bandwidth and the distance measurement inputs can be low-pass filtered in time to avoid initiating the session based on short-term variations of the metrics. In particular, low-pass filtering applied to the distance measurement should discard rate changes not expected for typical user velocity in an office environment (e.g. below 5 km/h).

Figure 3:
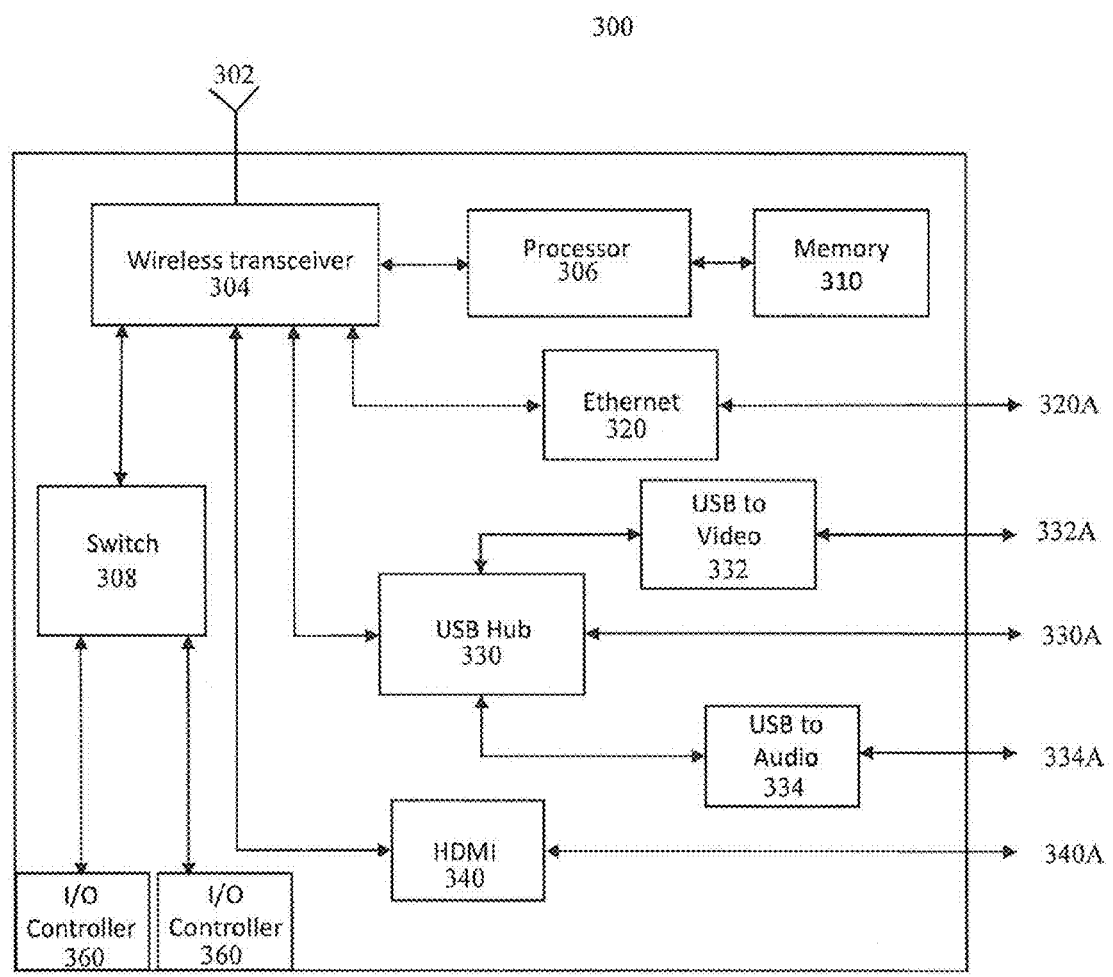
FIG. 3 shows an example of a docking station as an aspect of the disclosure.

FIG. 3 shows an example of a docking station 300 as an aspect of the disclosure. The docking station 300 includes at least one antenna 302 connected to a wireless transceiver 304. The wireless transceiver 304 is in turn coupled to a processor 306, or processing circuit. The processing circuit may be coupled to a memory 310 which may store user information for establishing a wireless connection, e.g. effective work areas for each user. The memory 310 may also be used as a computer readable medium to store program instructions. Alternatively, the docking station 300 may include no memory 310, but the docking station may use the memory of a device connected to it in order to store, for example, effective work areas for each user. The device used to store data for the docking station 300 may be connected via ports 320A, 332A, 330A, 334A, and/or 340A. The device may also be connected via input/output controllers 360.

A switch 308 is coupled to the wireless transceiver 304. The switch 308 is also coupled to a plurality of input/output (I/O) controllers 360. It should be appreciated that while only two I/O controllers 360 are shown in FIG. 3, the docking station may have more or less I/O controllers. The I/O controllers 360 connect and manage the communication between any type of peripheral devices connected to the docking station 300 and another device, such as a mobile phone, laptop, tablet, or the like (not pictured).

Peripheral devices may include, but not limited to, a monitor, a keyboard, a pointing device, a mouse, a storage device, a speaker, a stereo system, a microphone, headphones, a modem, a portable music player (e.g. compact disc player or MP3 player), a portable video player (e.g. DVD player), a video player, a projector, musical instruments, soundboards, cameras, video recording devices, mobile phones, computers (e.g. desktop or laptops), tablets, and the like.

The docking station may also include a plurality of bridges, 320, 330, 332, 334, and 340, for transforming data from a first type to a second type. It should be appreciated that the bridges described herein are merely examples and other types of bridges may be utilized. In this example, bridge 320 connects the wireless transceiver to an Ethernet port 320A, thereby enabling an interface to an Ethernet network. Bridge 330 is a universal serial bus (USB) hub, which may directly be connected to 334A, which may be a single USB 2.0 or SuperSpeed 3.0 port or a combination of such ports thereof, e.g. three USB 2.0 ports and two SuperSpeed 3.0 ports. The USB hub 330 may be connected to a USB to Video bridge 332, which may be utilized to convert USB data to video data, such as, but not limited to, BluRay or another high definition (HD) video format. The USB hub 330 may also be connected to a USB to Audio bridge 334, which may convert USB data to audio data. High-Definition Multimedia Interface (HDMI) Bridge 340 may connect the wireless transceiver to an HDMI port 340A, which may be connected to, for example, a monitor or computing device.

Figure 5:
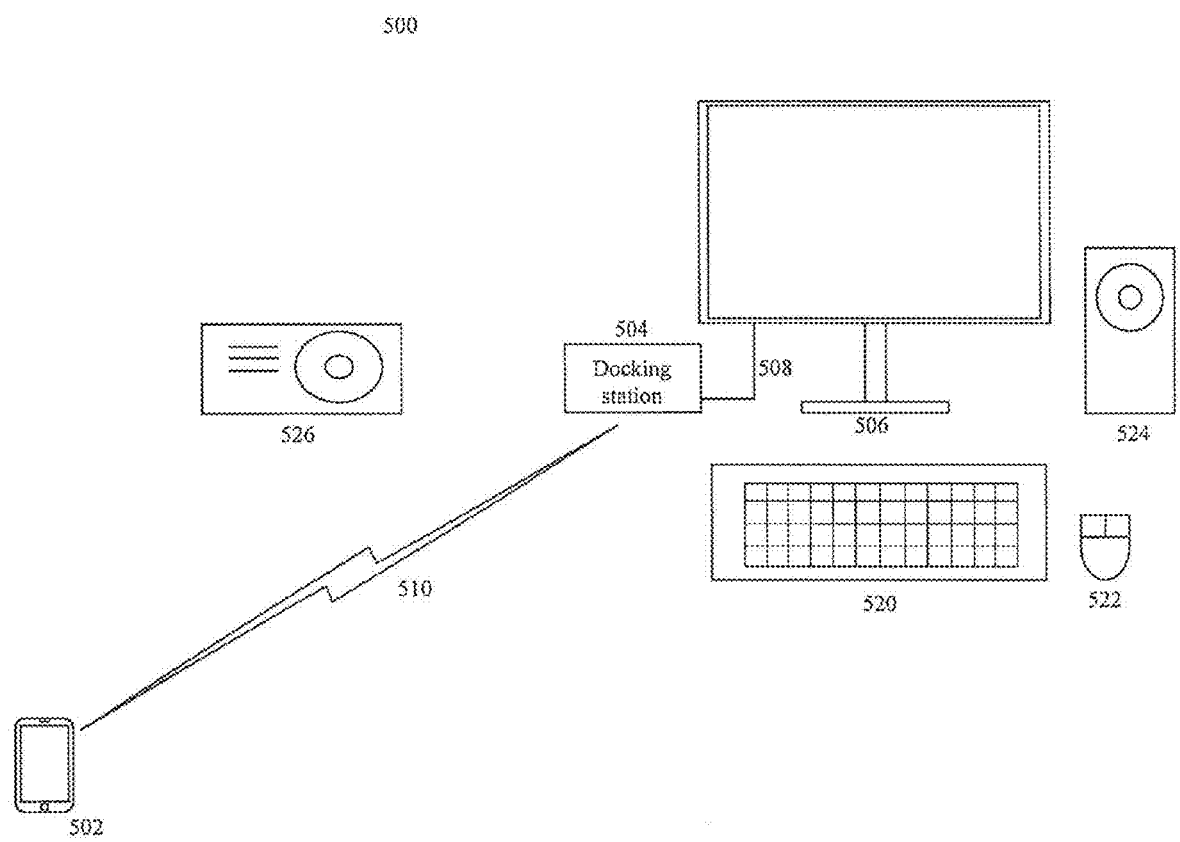
FIG. 5 shows another example of a working environment in which an aspect of the disclosure may be used.

The wireless transceiver 304 of the docking station receives and transmits signals to a device having a wireless transceiver, such as, but not limited to, a mobile phone, a laptop, a notebook computer, a tablet, a personal digital assistant, portable music player, and the like (shown in FIG. 5). The wireless connection between the wireless transceiver of the docking station 304 and the device may aggregate an unbound number of data lanes over an unlicensed frequency band, such as, for example, the 60 GHz frequency band. Furthermore, the wireless transceiver 304 establishes a wireless link between the docking station and the device and may act as the MAC. The wireless transceiver 304 may include a wireless receiver and a wireless transmitter in order to be able to perform as indicated above.

Figure 4:
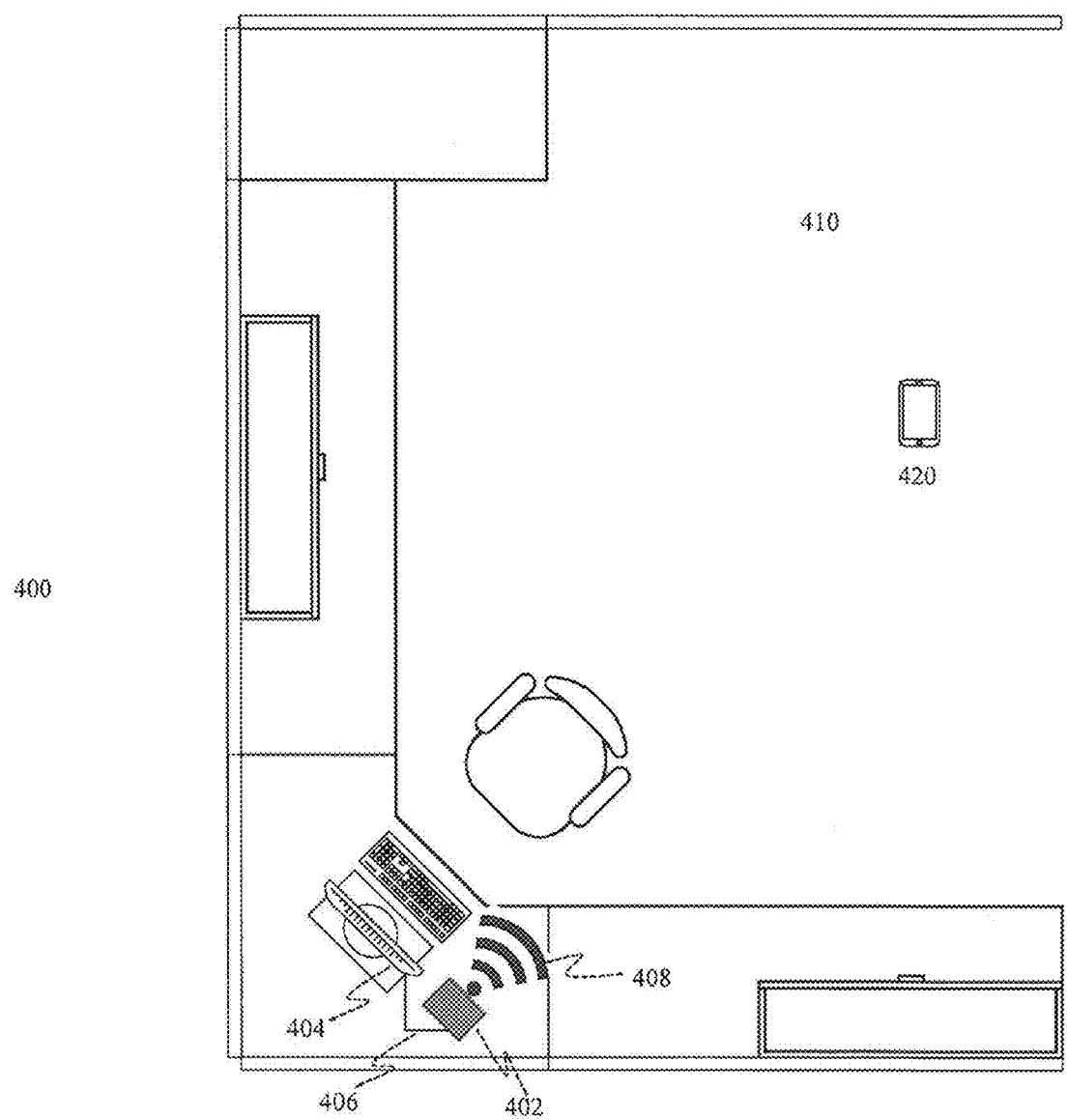
FIG. 4 shows an example of a working environment in which an aspect of the disclosure may be used.

FIG. 4 shows an example of a working environment 400 in which an aspect of the disclosure may be used. Docking station 402 is connected to a computer monitor 404 by, for example, an HDMI cable 406, in office space 410. When device 420, in this example, a mobile phone, enters within range of the docking station 402, the docking station may automatically initiate the admission and retention logic described in FIG. 2, that is, using both the BW and the effective work area (in this case: the maximum distance between the docking station and the device in office space 410) in deciding whether to establish a wireless link 408 between the docking station 402 and the device 420. In this example, the longest distance from device 420 to docking station 402 in office space 410, i.e. the effective work area, is used by the docking station 402 as an input in determining whether or not to allow the device 420 to establish a wireless connection. If the device leaves the office space 410, the wireless connection will automatically be dropped since the distance from the device to the docking station will be greater than the effective working area, even if the minimum BW requirements of the wireless link between the docking station 402 and the device 420 are still being met. In this manner, the user of device 420 can be assured that as soon as he leaves office space 410, the wireless link between the device 420 and the docking station 402 will be terminated.

FIG. 5 shows another example of a working environment 500 in which an aspect of this disclosure may be used. Docking station 504 is connected to a monitor 506 by video interface 508, e.g. HDMI cable, video graphics array (VGA) or DisplayPort. The device 502 establishes wireless connection 510 with docking station 504 once (1) the measured distance between the device 502 and the docking station 504 is less or equal to the predetermined effective work area and (2) the estimated wireless link BW is greater than the minimum BW requirements of connecting to the docking station. Once the device 502 establishes a wireless connection 510 with the docking station 504, the device 502 may be able to access any number of peripheral devices 520-526 in addition to the monitor 506. The peripheral devices in this example include a keyboard (e.g. a wireless keyboard) 520, a mouse (e.g. a wireless mouse) 522, a speaker (e.g. a wireless speaker) 524, and a projector (e.g. a wireless projector) 526. It should be appreciated that the peripheral devices shown in FIG. 5 are just some examples of the number of peripheral devices that may be used and not meant to be limiting. In addition, docking station 504 may be connected to, for example, a network (not pictured), e.g. via Ethernet, to allow the device 502 access to the network.

Once the wireless connection 510 is terminated (i.e. dropped) because, for example, the measured distance between the device 502 and the docking station 504 is greater than the effective work area used by the docking station, the device 502 will no longer have access to peripheral devices 520-526 or the monitor 506.

Figure 6:
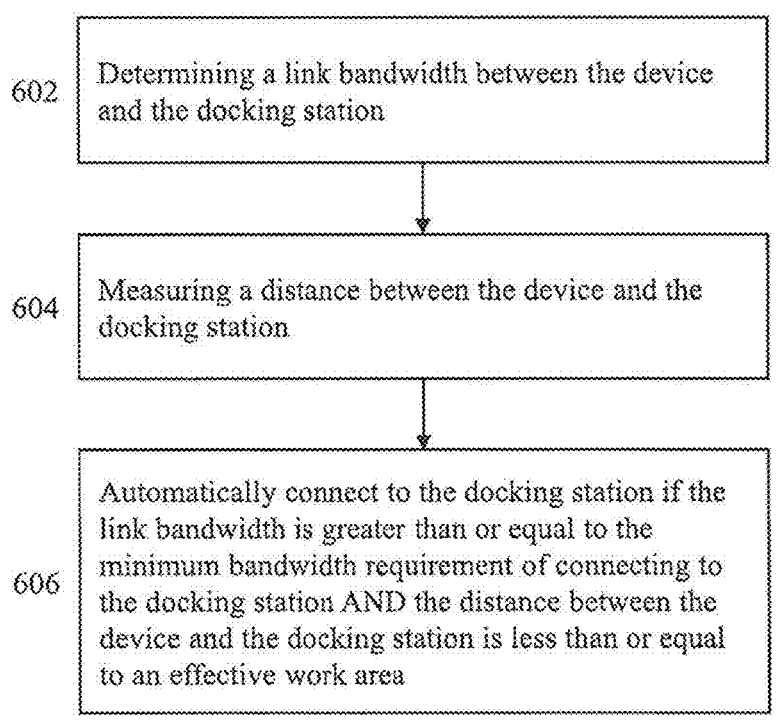
FIG. 6 shows a flowchart for connecting to a docking station in an aspect of the disclosure.

FIG. 6 shows a flowchart 600 for a method to connect to a docking station in an aspect of the disclosure. At 602, the link bandwidth (BW) between the device and the docking station is determined. At 604, the distance between the device and the docking station is measured. It should be appreciated that the order of 602 and 604 may be reversed, that is, the measuring of the distance between the device and the docking station is done before the determining of the link BW between the device and the docking station, or both 602 and 604 may occur simultaneously. Once both 602 and 604 have been performed, then a connection between the device and the docking station may be established in 606 if: (1) the link BW is greater than or equal to the minimum bandwidth requirement of connecting to the docking station and (2) the distance between the device and the docking station is less than or equal to a predetermined effective work area.

Figure 7:
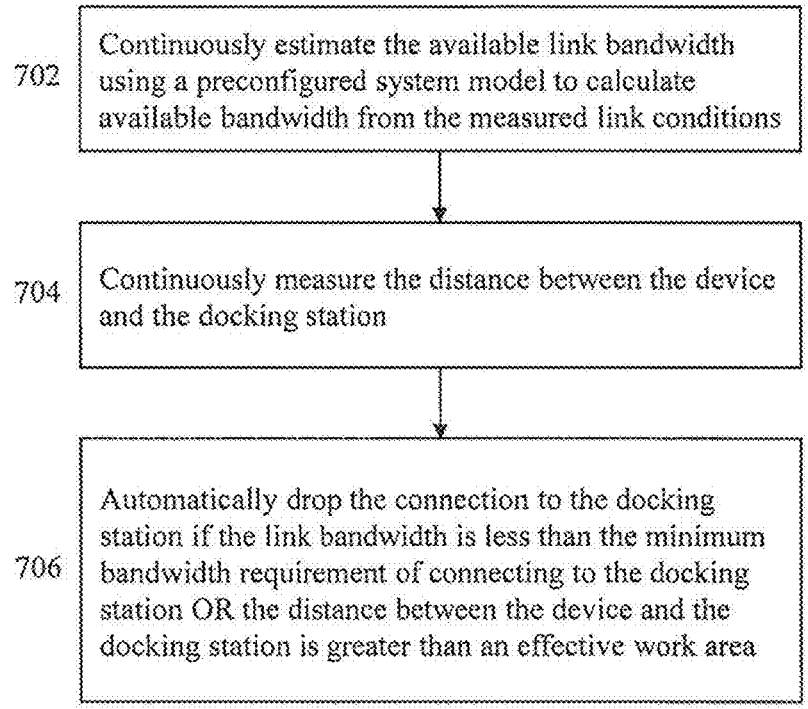
FIG. 7 shows a flowchart for dropping a connection to a docking station in an aspect of the disclosure.

FIG. 7 shows a flowchart 700 for a method to terminate (i.e. drop) a wireless connection between a device and a docking station in an aspect of this disclosure. At 702, the docking station continuously estimates the available link bandwidth using a preconfigured system model (e.g. MAC/PHY) to calculate available bandwidth from the measured link conditions. At 704, the docking station also continuously measures the distance between the device and the docking station. It should be appreciated that 702 and 704 may be occurring simultaneously, or in a particular sequence, for e.g. 704 may be occurring at a more frequent rate than 702. At 706, the wireless connection between the device and the docking station may be dropped (i.e. terminated) if: (1) the link bandwidth is less than the minimum bandwidth requirement of connecting to the docking station or (2) the distance between the device and the docking station is greater than the predetermined effective work area.

FIG. 8 shows a flowchart 800 for connecting to a docking station in an aspect of the disclosure. In 802, the docking station obtains the monitor size information by reading the extended display identification data (EDID) over a video interface, e.g. HDMI, DisplayPort, mini DisplayPort, or digital video interface (DVI), by which the docking station is connected to the monitor. The monitor size is reported as maximum horizontal and vertical size in centimeters in bits 21 and 22 of the EDID structure as defined by the Video Electronics Standards Association (VESA) EDID standard. This information is used to calculate the monitor size in inches, where the monitor size is the diagonal measurement of the monitor screen, i.e. from the bottom left corner of the screen to the top right corner of the screen. In 804, the monitor size is used to look up an effective work area in a preconfigured table 900, shown in FIG. 9. The physical size of the effective work area can be determined based on the distance at which the average user can see the information displayed on the monitor. This preconfigured table 900, or a similar table, may be stored in the memory of the docking station or may be accessible to the docking station on a device connected to the docking station, e.g. a memory storage device or computer. The effective work area from the table may be initially used in establishing wireless connection with a device. This effective work area may later be refined or adjusted, as shown in FIG. 10.

In 806, the link BW between the device and the docking station is determined, i.e. estimated. In 808, the docking station determines whether the determined (i.e. estimated) link BW is greater than or equal to a minimum BW requirement to connect to the docking station. If it is not, then the docking station will go back to 806. If the estimated link BW is greater than the minimum BW requirements, the docking station will then move on to 810 to measure the distance between the device and the docking station. In 812, the distance measured in 810 is compared to the effective work area that was determined in 804. If the distance measured is greater than the effective work area, then the distance must be measured again in 810, or the process may revert back to 806 where the link BW between the device and the docking station is determined. If the distance measured is less than or equal to the effective work area, then a connection is established between the docking station and the device in 814. In the alternative, the comparison of the distance measured to the effective work area may take place before the comparison of the estimated link BW between the device and the docking station and the minimum BW requirements. Also, both comparisons, i.e. (1) the distance to the dock vs. the effective work area, and (2) the estimated link BW vs. the minimum BW requirement, may take place simultaneously. In other words, they would appear in parallel in a flowchart similar to FIG. 8, where the connection is established only in the event that both requirements are met.

Figure 10:
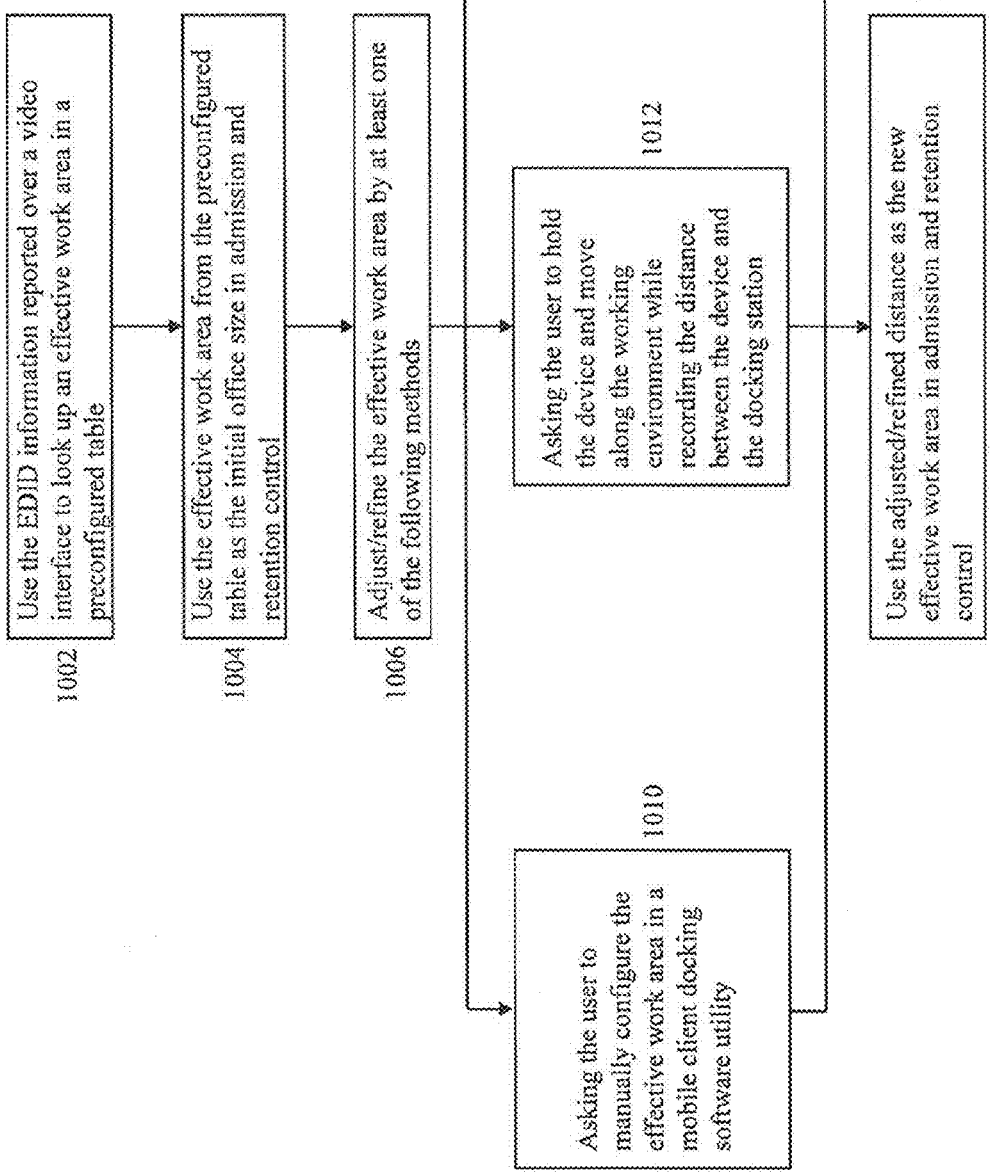
FIG. 10 shows a flowchart for refining/adjusting the effective work area in an aspect of the disclosure.

In FIG. 10, a flowchart 1000 for adjusting, i.e. refining, the effective work area in an aspect of the disclosure is shown. In 1002, the effective work area is initially determined by using the EDID information reported over a video interface to look up an effective work area in a preconfigured table, such as one shown in FIG. 9. In the situation where the EDID information cannot be read or a monitor size may not be determined, the largest effective work area in the table (e.g. in the case of FIG. 9, 4 meters) may be used. In 1004, this effective work area is used as the initial, predetermined effective work area in admission and retention control. If the user is satisfied with this effective work area, then this effective work area may be the one used in the future. However, the user may also adjust or refine the effective work area in 1006 by methods shown in 1010, 1012, and/or 1014.

In 1010, the user may be asked to manually configure the effective work area in the mobile client docking software utility. The user may be prompted by the mobile docking software utility shortly after initiating the wireless session. The greatest distance entered by the user may then be used as the new effective work area. Alternatively, the software utility may ask the user for specific office dimensions, e.g. width and length of the office, which may then be used as the effective work area in admission and retention control. In this manner, the wireless docking station will compare the distance from docking station to the device using the office dimensions as the effective work area, thereby increasing the complexity of the admission and retention control logic.

In 1012, the user may be asked to hold the mobile client and move along the working environment, i.e. the actual office space, while the distance between the mobile client and the docking station is recorded. This distance may be recorded by the docking station. The maximum distance recorded between the mobile client and the docking station may be used as the effective work area to be used in admission and retention control. Alternatively, the actual dimensions of the effective work area may be measured in this method and stored. Thereafter, the measured dimensions may be used in admission and retention control.

In 1014, the docking station may silently record the measured distance between the device and the docking station while the user is working in the wireless docking station system. For example, the docking station may monitor and silently record the activity of a tablet while the user is using the tablet to work on the wireless docking station. Once the user stops using the tablet to perform work on the wireless docking station, the docking station may determine that that tablet (i.e. the device) is no longer in the effective work area. The docking station will then use the maximum recorded distance of activity of the tablet on the docking station as the effective work area. Also, the docking station may silently record the locations where the tablet is working on the docking station, thereby recording dimensions of the office space and storing said dimensions as the effective work area. In the above example, a tablet is used as an example for a device that may be used with the docking station, and should not be deemed to be limiting by any means.

1014 requires a mechanism to detect when the user is actually working in the wireless docking station (i.e. system), as opposed to having unintentionally connected when outside the working environment. A possible mechanism to distinguish between these two would be to monitor activity of a peripheral device, such as a pointing device, e.g. a mouse, or a keyboard, connected to the dock. This activity can occur only when the user is physically located in the working environment. In 1014, a minimum data collecting time needs to be met until the effective work area is assumed to be determined. Until this happens, the effective work area used in 1004 or as determined by 1010 and/or 1012 may be used. This minimum data collecting time may be set by the user or automatically set by the docking station. For example, a minimum data collecting time may be any time in the range of 1-20 minutes. The minimum data collecting time may depend on the work environment, i.e. whether the client device will be moving around or be mostly stationary.

Once either 1010, 1012, or 1014, or any combination thereof, have been used to refine or adjust the predetermined effective work area, the new adjusted effective work area may be used by the docking station instead of the initial predetermined effective work area that was used in 1004 using a table such as the one shown in FIG. 9.

A combination of different mechanisms is also possible, for example, where the user is asked to configure the effective work area using 1010 or 1012 if 1014 does not provide consistent results. Alternatively, the user may proactively choose to initiate 1010 or 1012 if the user is not satisfied with the effective work area determined in 1014.

Mechanisms 1012 and 1014 may rely on the docking station having some way to measure the distance between the device and the docking station, for example, by measuring the propagation time of transmitted and received data either in the same wireless link that is used to transport the wireless docking session or in another wireless link between the device (i.e. mobile client) and the docking station. It should be noted that other mechanisms to determine the effective work area in a similar manner may be employed.

The effective work area measurements may be stored at the docking station. Different effective work area estimations may be stored for each different user in the assumption that each user may use the docking station (i.e. system) at different ranges. Alternatively, the effective work area measurements may be stored in a memory of a peripheral device connected to the docking station.

Initial effective work area measurement refining can either be triggered by the user (e.g. as an option in the docking software utility) or the docking station (i.e. docking system) can request the user to do so when it estimates that the user is not satisfied with the default effective work area used by the docking station. This situation can be identified, for example, by detecting a user request to terminate the wireless session shortly after the session has been automatically initiated (e.g. 10 seconds or less).

In Example 1, a method for establishing a wireless connection between a docking station and a device, the method comprising determining a link bandwidth between the device and the docking station, measuring the distance between the device and the docking station, and configuring the device to automatically connect to the docking station if the link bandwidth is greater than or equal to a minimum bandwidth requirement for connecting to the docking station and the distance between the device and the docking station is less than or equal to an effective work area.

In Example 2, the subject matter of Example 1 can optionally include configuring the device to disconnect the wireless connection if the link bandwidth is less than the minimum bandwidth requirement of connecting to the docking station, or the distance between the device and the docking station is greater than the effective work area.

In Example 3, the subject matter of any one of Examples 1-2 can optionally include that the effective work area is based on the size of a monitor to which the docking station is connected. This initial determination of the effective work area may later be adjusted as explained in ensuing Examples.

In Example 4, the subject matter of Example 3 can optionally include that the size of the monitor is used to determine the effective work area from a preconfigured table.

In Example 5, the subject matter of any one of Examples 3-4 can optionally include that the size of the monitor is determined by reading the extended display identification data (EDID) over a video interface between the docking station and the monitor.

In Example 6, the subject matter of Example 5 can optionally include that the video interface is a high-definition multimedia interface (HDMI).

In Example 7, the subject matter of Example 5 can optionally include that the video interface is a DisplayPort or a mini DisplayPort.

In Example 8, the subject matter of any one of Examples 3-7 can optionally include that a size of a monitor of about twenty four inches or less corresponds to an effective work area of about two meters.

In Example 9, the subject matter of any one of Examples 3-8 can optionally include that a size of a monitor of about twenty four to about sixty inches corresponds to an effective work area of about three meters.

In Example 10, the subject matter of any one of Examples 3-9 can optionally include that a size of a monitor of greater than sixty inches corresponds to an effective work area of about four meters.

In Example 11, the subject matter of any one of Examples 1-10 can optionally include adjusting the effective work area by measuring the time of transmitting and receiving a data between the device and the docking station.

In Example 12, the subject matter of any one of Examples 1-11 can optionally include adjusting the effective work area by requesting manual input from the user to configure the effective work area in a mobile client docking software utility.

In Example 13, the subject matter of any one of Examples 1-12 can optionally include adjusting the effective work area by requesting a hold of the device by the user and moving along a working environment while the distance between the device and the docking station is recorded, wherein the maximum distance recorded is used as the effective work area.

In Example 14, the subject matter of any one of Examples 1-13 can optionally include that the effective work area may later be adjusted by silently recording the distance between the device and the docking station while a user is working on the docking station, wherein the maximum distance measured is recorded as the effective work area.

In Example 15, the subject matter of Example 14 can optionally include that the user is determined to be working whenever there is activity on the device or a peripheral device.

In Example 16, the subject matter of Example 15 can optionally include that the peripheral device is a keyboard, a pointing device, a mouse, a laptop computer, a notebook computer, a tablet, a mobile phone, a personal digital assistant, a portable music player, or a portable video player.

In Example 17, the subject matter of any one of Examples 14-16 can optionally include adjusting the effective work area by silently recording the distance between the device and the docking station at least for a minimum time.

In Example 18, the subject matter of any one of Examples 1-17 can optionally include storing the effective work area for a user in a memory of the docking station.

In Example 19, the subject matter of any one of Examples 1-18 can optionally include storing different effective work areas for a plurality of users in a memory of the docking station.

In Example 20, the subject matter of any one of Examples 1-19 can optionally include receiving a command from a user to trigger an adjustment of the effective work area.

In Example 21, the subject matter of any one of Examples 1-20 can optionally include triggering an adjustment of the effective work area when the docking station identifies that the user is not satisfied with the effective work area used by the docking station.

In Example 22, the subject matter of Example 21 can optionally include identifying that the user is not satisfied with the effective work area used by the docking station by detecting a user request to terminate the wireless connection shortly after the connection has been automatically connected.

In Example 23, the subject matter any one of Examples 21-22 can optionally include detecting the user request to terminate the connection at or less than about ten seconds after the connection has been automatically connected.

In Example 24, the subject matter of any one of Examples 1-23 can optionally include low-pass filtering the bandwidth input and the distance estimation input in time to avoid initiating the wireless connection based on short-term variations of the inputs.

In Example 25, the subject matter of Example 24 can optionally include applying the low-pass filtering to the distance estimation input to discard rate changes not expected for typical user velocity in an office environment.

In Example 26, the subject matter of any one of Examples 4-25 can optionally include using the greatest effective work area in the preconfigured table until the docking station obtains the monitor size data.

In Example 27, the subject matter of any of Examples 1-26 can optionally include operating in frequency bands at or above about 31.8 GHz.

In Example 28, the subject matter of any of Examples 1-26 can optionally include comprising operating in frequency bands at or above about 60 GHz.

In Example 29, the subject matter of any one of Examples 1-28 can optionally include connecting to at least one peripheral device.

In Example 30, the subject matter of Example 29 can optionally include that the at least one peripheral device is at least one of a monitor, a keyboard, a pointing device, a mouse, a laptop computer, a notebook computer, a tablet, a mobile phone, a personal digital assistant, a storage device, a modem, a projector, a portable music player, a portable video player, headphones, a microphone, a stereo system, a speaker, a musical instrument, a soundboard, a camera, and/or a video recording device.

In Example 31, a docking station comprising a wireless transceiver, a plurality of bridges configured to convert a data from a first type to a second type, a switch coupled to a plurality of input/output (I/O) controllers, and a processor configured to determine a link bandwidth between a device and the docking station and measure a distance between the device and the docking station, wherein the docking station is configured to automatically establish a wireless connection to the device if the link bandwidth is greater than or equal to a minimum bandwidth requirement for the device to connect to the docking station and the distance between the device and the docking station is less than or equal to an effective work area.

In Example 32, the subject matter of Example 31 can optionally include that the docking station comprises a memory. The memory can be configured to store the effective work area and/or the minimum bandwidth requirement. The memory can also be configured to store program instructions causing the other components of the docking station to establish a wireless connection between the docking station and a device.

In Example 33, the subject matter of any one of Examples 31 or 32 can optionally include that the docking station is further configured to disconnect the wireless connection if the link bandwidth is less than the minimum bandwidth requirement of connecting to the docking station, or the distance between the device and the docking station is greater than the effective work area.

In Example 34, the subject matter of any one of Examples 31-33 can optionally include that the docking station is further configured to determine the effective work area by the size of a monitor to which the docking station is connected. This initial determination of the effective work area may later be adjusted as explained in ensuing Examples.

In Example 35, the subject matter of Example 34 can optionally include that the docking station is further configured to use the size of the monitor to look up an effective work area in a preconfigured table.

In Example 36, the subject matter of Example 34 or 35 can optionally include that the size of the monitor is determined by reading the extended display identification data (EDID) over a video interface between the docking station and the monitor.

In Example 37, the subject matter of Example 36 can optionally include that the video interface is a high-definition multimedia interface (HDMI).

In Example 38, the subject matter of Example 36 or 37 can optionally include that the video interface is a DisplayPort or a mini DisplayPort.

In Example 39, the subject matter of any one of Examples 34-38 can optionally include that a size of a monitor of about twenty four inches or less corresponds to an effective work area of about two meters.

In Example 40, the subject matter of any one of Examples 34-39 can optionally include that a size of a monitor of about twenty four to about sixty inches corresponds to an effective work area of about three meters.

In Example 41, the subject matter of any one of Examples 34-40 can optionally include that a size of a monitor of greater than about sixty inches corresponds to an effective work area of about four meters.

In Example 42, the subject matter of any one of Examples 31-41 can optionally include that the docking station is further configured to adjust the effective work area by measuring the time of transmitting and receiving a data between the device and the docking station.

In Example 43, the subject matter of any one of Examples 31-42 can optionally include that the docking station is further configured to adjust the effective work area by asking the user to manually configure the effective work area in a mobile client docking software utility.

In Example 44, the subject matter of any one of Examples 31-43 can optionally include that the docking station is further configured to adjust the effective work area by request of a hold of the device by the user and moving along a working environment while the distance between the device and the docking station is recorded, wherein the maximum distance recorded is used as the effective work area.

In Example 45, the subject matter of any one of Examples 31-44 can optionally include that the docking station is further configured to adjust the effective work area by silently recording the distance between the device and the docking station while a user is working on the docking station, wherein the maximum distance measured is recorded as the effective work area.

In Example 46, the subject matter of Example 45 can optionally include that the docking station is further configured to determine that the user is working whenever there is activity on the device.

In Example 47, the subject matter of Example 46 can optionally include that the device is a keyboard, a pointing device, a mouse, a laptop computer, a notebook computer, a tablet, a mobile phone, a personal digital assistant, a portable music player, or a portable video player.

In Example 48, the subject matter of any one of Examples 45-47 can optionally include that the docking station is further configured to adjust the effective work area by silently recording the distance between the device and the docking station at least for a minimum time.

In Example 49, the subject matter of any one of Examples 32-48 can optionally include the memory is further configured to store the effective work area for a user.

In Example 50, the subject matter of any one of Examples 32-49 can optionally include the memory is further configured to store different effective work areas for a plurality of users.

In Example 51, the subject matter of any one of Examples 31-50 can optionally include that the docking station is further configured to receive a user command to adjust the effective work area.

In Example 52, the subject matter of any one of Examples 31-51 can optionally include that the docking station is further configured to trigger an adjustment of the effective work area when the docking station identifies that the user is not satisfied with the effective work area used by the docking station. In other words, the docking station, i.e. the processor of the docking station, can be configured to detect that the user is not satisfied with the effective work area currently being used, and the docking station can trigger an effective work area adjustment.

In Example 53, the subject matter of Examples 52 can optionally include that the docking station is configured to identify that the user is not satisfied with the effective work area used by the docking station by detecting a user request to terminate the wireless connection shortly after the wireless connection has been automatically connected.

In Example 54, the subject matter of Example 53 can optionally include wherein the user request to terminate the connection occurs at or less than about ten seconds after the connection has been automatically connected.

In Example 55, the subject matter of any one of Examples 31-54 can optionally include that the docking station is further configured to low-pass filter the link bandwidth and the distance inputs in time to avoid initiating the wireless connection based on short-term variations of the inputs.

In Example 56, the subject matter of Example 55 can optionally include that the docking station is further configured to apply the low-pass filter to the distance estimation input to discard rate changes not expected for typical user velocity in an office environment.

In Example 57, the subject matter of any one of Examples 35-56 can optionally include that the docking station is configured to use the greatest effective work area in the preconfigured table until the monitor size is obtained by the docking station.

In Example 58, the subject matter of any one of Examples 31-57 can optionally include that the docking station is configured to operate on frequency bands at or above about 31.8 GHz.

In Example 59, the subject matter of any one of Examples 31-57 can optionally include that the docking station is configured to operate on frequency bands above about 60 GHz.

In Example 60, the subject matter of any one of Examples 31-59 can optionally include that the docking station is connected to at least one peripheral device.

In Example 61, the subject matter of Example 60 can optionally include that the at least one peripheral device is at least one of a monitor, a keyboard, a pointing device, a mouse, a laptop computer, a notebook computer, a tablet, a mobile phone, a personal digital assistant, a storage device, a modem, a projector, a portable music player, a portable video player, headphones, a microphone, a stereo system, a speaker, a musical instrument, a soundboard, a camera, and/or a video recording device.

In Example 62, a non-transitory computer readable medium containing program instructions to establish a wireless connection between a docking station and a device, comprising determining a link bandwidth between the device and the docking station, measuring a distance between the device and the docking station, and configuring the device to automatically connect to the docking station if the link bandwidth is greater than or equal to a minimum bandwidth requirement for connecting to the docking station and the distance between the device and the docking station is less than or equal to an effective work area.

In Example 63, the subject matter of Example 62 can optionally include configuring the device to disconnect the wireless connection if the link bandwidth is less than the minimum bandwidth requirement of connecting to the docking station, or the distance between the device and the docking station is greater than the effective work area.

In Example 64, the subject matter of any one of Examples 62-63 can optionally include that the effective work area is based on the size of a monitor to which the docking station is connected. This determination of the effective work area can later be adjusted as shown in the Examples that follow.

In Example 65, the subject matter of Example 64 can optionally include that the size of the monitor is used to determine an effective work area from a preconfigured table.

In Example 66, the subject matter of any one of Examples 64-65 can optionally include that the size of the monitor is determined by reading the extended display identification data (EDID) over a video interface between the docking station and the monitor.

In Example 67, the subject matter of Example 66 can optionally include that the video interface is a high-definition multimedia interface (HDMI).

In Example 68, the subject matter of Example 66 or 67 can optionally include that the video interface is a DisplayPort or a mini DisplayPort.

In Example 69, the subject matter of any one of Examples 64-68 can optionally include that a size of a monitor of twenty four inches or less corresponds to an effective work area of about two meters.

In Example 70, the subject matter of any one of Examples 64-69 can optionally include that a size of a monitor of twenty four to sixty inches corresponds to an effective work area of about three meters.

In Example 71, the subject matter of any one of Examples 64-70 can optionally include that a size of a monitor of greater than sixty inches corresponds to an effective work area of about four meters.

In Example 72, the subject matter of any one of Examples 62-71 can optionally include adjusting the effective work area by measuring the time of transmitting and receiving a data between the device and the docking station.

In Example 73, the subject matter of any one Examples 62-72 can optionally include adjusting the effective work area by requesting manual input from the user to configure the effective work area in a mobile client docking software utility.

In Example 74, the subject matter of any one of Examples 62-73 can optionally include adjusting the effective work area by requesting a hold of the device by the user and moving along a working environment while the distance between the device and the docking station is recorded, wherein the maximum distance recorded is used as the effective work area.

In Example 75, the subject matter of any one of Examples 62-74 can optionally include adjusting the effective work area comprises silently recording the distance between the device and the docking station while a user is working on the docking station, wherein the maximum distance measured is recorded as the effective work area.

In Example 76, the subject matter of Example 75 can optionally include monitoring the device or a peripheral device for activity to determine whether the user is working on the docking station.

In Example 77, the subject matter of Example 76 can optionally include that the peripheral device is a keyboard, a pointing device, a mouse, a laptop computer, a notebook computer, a tablet, a mobile phone, a personal digital assistant, a portable music player, or a portable video player.

In Example 78, the subject matter of any one of Examples 75-77 can optionally include adjusting the effective work area by silently recording the distance between the device and the docking station at least for a minimum time.

In Example 79, the subject matter of any one of Examples 62-78 can optionally include storing the effective work area for a user in a memory of the docking station.

In Example 80, the subject matter of any one of Examples 62-79 can optionally include storing different effective work areas for a plurality of users in a memory of the docking station.

In Example 81, the subject matter of any one of Examples 62-80 can optionally include receiving a command from a user to trigger an adjustment of the effective work area.

In Example 82, the subject matter of any one of Examples 62-81 can optionally include triggering an adjustment of the effective work area when the docking station identifies that the user is not satisfied with the effective work area used by the docking station.

In Example 83, the subject matter of Example 82 can optionally include identifying that the user is not satisfied with the effective work area used by the docking station by detecting a user request to terminate the wireless connection shortly after the connection has been automatically connected.

In Example 84, the subject matter of any one of Examples 82-83 can optionally include detecting the user request to terminate the connection at or less than about ten seconds after the connection has been automatically connected.

In Example 85, the subject matter of any one of Examples 62-84 can optionally include low-pass filtering the bandwidth input and the distance estimation input in time to avoid initiating the wireless connection based on short-term variations of the inputs.

In Example 86, the subject matter of Example 85 can optionally include applying the low-pass filtering to the distance estimation input to discard rate changes not expected for typical user velocity in an office environment.

In Example 87, the subject matter of any one of Examples 65-86 can optionally include using the greatest effective work area in the preconfigured table until the docking station obtains the monitor size data.

In Example 88, the subject matter of any one of Examples 62-87 can optionally include operating in frequency bands at or above about 31.8 GHz.

In Example 89, the subject matter of any one of Examples 62-87 can optionally include operating in frequency bands at or above about 60 GHz.

In Example 90, the subject matter of any one of Examples 62-89 can optionally include connecting to at least one peripheral device.

In Example 91, the subject matter of any one of Examples 62-90 can optionally include that the at least one peripheral device is at least one of a monitor, a keyboard, a pointing device, a mouse, a laptop computer, a notebook computer, a tablet, a mobile phone, a personal digital assistant, a storage device, a modem, a projector, a portable music player, a portable video player, headphones, a microphone, a stereo system, a speaker, a musical instrument, a soundboard, a camera, and/or a video recording device.

In Example 92, the subject matter of any one of Examples 62-91 can optionally include that the program instructions are stored in a memory in the docking station.

In Example 93, the subject matter of any one of Examples 62-91 can optionally include that the program instructions are stored in a memory external to the docking station.

In Example 94, the subject matter of Example 93 can optionally include that the memory external to the docking station is a device connected to the docking station.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes within the meaning and range of equivalency of the claims are therefore intended to be embraced.

What is claimed is:

1. A docking station, comprising:
   a wireless transceiver;
   a plurality of bridges configured to convert a data from a first type to a second type;
   a switch coupled to a plurality of input/output (I/O) controllers; and
   a processer configured to:
      determine a link bandwidth between a device and the docking station, and
      measure a distance between the device and the docking station;
   wherein the docking station is configured to automatically establish a wireless connection to the device if:
      the link bandwidth is greater than or equal to a minimum bandwidth requirement for connecting to the docking station, and
      the distance between the device and the docking station is less than or equal to an effective work area;
      wherein the effective work area is determined by at least one or more from the following group:
         a size of a monitor to which the docking station is connected;
         requesting manual input from a user to adjust the effective work area in a mobile client docking software utility;
         requesting a hold of the device by a user and moving along a working environment while the distance between the device and the docking station is recorded, wherein the maximum distance recorded is used as the effective work area;
         silently recording the distance between the device and the docking station while a user is working on the docking station, wherein the maximum distance measured is recorded as the effective work area;
         silently recording a distance between the device and the docking station at least for a minimum time; and combinations thereof.

2. The docking station of claim 1, the docking station further configured to disconnect the wireless connection if:
   the link bandwidth is less than the minimum bandwidth requirement of connecting to the docking station, or
   the distance between the device and the docking station is greater than the effective work area.

3. The docking station of claim 1, further comprising a memory configured to store the effective work area.

4. The docking station of claim 1, the docking station further configured to use the size of the monitor to determine the effective work area from a preconfigured table.

5. The docking station of claim 1, the docking station further configured to determine the size of the monitor by reading an extended display identification data (EDID) over a video interface between the docking station and the monitor.

6. The docking station of claim 1, the docking station further configured to determine that the user is working whenever there is activity on the device.

7. The docking station of claim 1, the docking station further configured to trigger an adjustment of the effective work area when the docking station identifies that the user is not satisfied with the effective work area used by the docking station.

8. A method for establishing a wireless connection between a docking station and a device, the method comprising:
   determining a link bandwidth between the device and the docking station;
   measuring a distance between the device and the docking station; and
   configuring the device to automatically connect to the docking station if:
      the link bandwidth is greater than or equal to a minimum bandwidth requirement for connecting to the docking station; and
      the distance between the device and the docking station is less than or equal to an effective work area;
      wherein the effective work area is determined by at least one or more from the following group:
         a size of a monitor to which the docking station is connected;
         requesting manual input from a user to adjust the effective work area in a mobile client docking software utility;
         requesting a hold of the device by a user and moving along a working environment while the distance between the device and the docking station is recorded, wherein the maximum distance recorded is used as the effective work area;
         silently recording the distance between the device and the docking station while a user is working on the docking station, wherein the maximum distance measured is recorded as the effective work area;
         silently recording a distance between the device and the docking station at least for a minimum time; and combinations thereof.

9. The method of claim 8, further comprising configuring the device to disconnect the wireless connection if:
   the link bandwidth is less than the minimum bandwidth requirement of connecting to the docking station, or
   the distance between the device and the docking station is greater than the effective work area.

10. A non-transitory computer readable medium containing program instructions to establish a wireless connection between a docking station and a device, comprising:
    determining a link bandwidth between the device and the docking station;
    measuring a distance between the device and the docking station; and
    configuring the device to automatically connect to the docking station if:
       the link bandwidth is greater than or equal to a minimum bandwidth requirement for connecting to the docking station; and
       the distance between the device and the docking station is less than or equal to an effective work area;

wherein the effective work area is determined by at least one or more from the following group:
a size of a monitor to which the docking station is connected;
requesting manual input from a user to adjust the effective work area in a mobile client docking software utility;
requesting a hold of the device by a user and moving along a working environment while the distance between the device and the docking station is recorded, wherein the maximum distance recorded is used as the effective work area;
silently recording the distance between the device and the docking station while a user is working on the docking station, wherein the maximum distance measured is recorded as the effective work area;
silently recording a distance between the device and the docking station at least for a minimum time; and combinations thereof.

11. The non-transitory computer readable medium of claim 10, further comprising configuring the device to disconnect the wireless connection if:
the link bandwidth is less than the minimum bandwidth requirement of connecting to the docking station, or
the distance between the device and the docking station is greater than the effective work area.

* * * * *